United States Patent
Jiang (10) Patent No.: US 12,372,600 B2
(45) Date of Patent: Jul. 29, 2025

(54) POSITIONING METHOD, DEVICE, SYSTEM, TERMINAL FOR POSITION OF INTERNET OF VEHICLES APPARATUS AND STORAGE MEDIUM

(71) Applicant: XI'AN ZHONGXING NEW SOFTWARE CO., LTD., Xi'an (CN)

(72) Inventor: Shuangfeng Jiang, Shaanxi (CN)

(73) Assignee: XI'AN ZHONGXING NEW SOFTWARE CO., LTD., Xi'an (CN)

( * ) Notice: Subject to any disclaimer, the term of this patent is extended or adjusted under 35 U.S.C. 154(b) by 573 days.

(21) Appl. No.: 17/436,819

(22) PCT Filed: Jun. 24, 2020

(86) PCT No.: PCT/CN2020/098274
§ 371 (c)(1),
(2) Date: Mar. 4, 2022

(87) PCT Pub. No.: WO2021/051921
PCT Pub. Date: Mar. 25, 2021

(65) Prior Publication Data
US 2022/0397631 A1    Dec. 15, 2022

(30) Foreign Application Priority Data
Sep. 20, 2019 (CN) .......................... 201910895034.4

(51) Int. Cl.
*H04W 4/44* (2018.01)
*G01S 5/00* (2006.01)
(Continued)

(52) U.S. Cl.
CPC .............. *G01S 5/0072* (2013.01); *G01S 5/10* (2013.01); *G01S 19/48* (2013.01); *H04W 4/44* (2018.02)

(58) Field of Classification Search
CPC ..... H04W 74/002; H04W 4/029; H04W 4/40; H04W 76/10; H04W 36/0016; H04W 36/362; H04W 36/0072
(Continued)

(56) References Cited

U.S. PATENT DOCUMENTS

| 8,515,447 B2 * | 8/2013 | Lin ..................... H04W 74/002 |
| | | 455/456.1 |
| 10,687,175 B2 * | 6/2020 | Kim ........................ H04W 4/40 |

(Continued)

FOREIGN PATENT DOCUMENTS

| CN | 102930738 A | 2/2013 |
| CN | 106710281 A | 5/2017 |

(Continued)

OTHER PUBLICATIONS

English translation of CN109633543, Feb. 2025 (Year: 2025).*
(Continued)

*Primary Examiner* — William D Cumming
(74) *Attorney, Agent, or Firm* — Vivacqua Crane, PLLC (57) ABSTRACT

A positioning method, device, system, terminal, and a non-transitory computer-readable storage medium are disclosed. The positioning method may include: continuously and at intervals sending broadcast packets including at least RSU location information and message sending time to the vehicle-to-everything (V2X) apparatus (100) through at least 3 road side units (RSUs) (RSU1, RSU2, RSU3) with fixed locations; when the positioning system of the V2X apparatus (100) is abnormal, by using the information in the broadcast packets and the information at the time before the abnormality of the positioning system of the V2X apparatus (100), calculating and obtaining the location information of the V2X apparatus (100) in real time.

4 Claims, 4 Drawing Sheets

(51) Int. Cl.
   *G01S 5/10*       (2006.01)
   *G01S 19/48*      (2010.01)
(58) Field of Classification Search
   USPC .................................................... 455/456.1
   See application file for complete search history.

(56) References Cited

U.S. PATENT DOCUMENTS

| | | | | |
|---|---|---|---|---|
| 10,834,643 | B2* | 11/2020 | Park | H04W 36/0016 |
| 11,564,133 | B2* | 1/2023 | Park | H04W 36/0044 |
| 11,641,644 | B2* | 5/2023 | Badic | G05D 1/606 |
| | | | | 370/329 |
| 11,737,169 | B2* | 8/2023 | Kalkunte | H04W 4/46 |
| | | | | 370/329 |
| 11,997,106 | B2* | 5/2024 | Zhu | H04W 4/06 |
| 12,082,308 | B2* | 9/2024 | Kalkunte | H04W 76/15 |
| 12,219,444 | B2* | 2/2025 | Hwang | H04W 4/40 |
| 2012/0149389 | A1* | 6/2012 | Lin | H04W 74/002 |
| | | | | 455/456.1 |
| 2016/0323715 | A1* | 11/2016 | Leroux | H04W 4/029 |
| 2018/0192268 | A1* | 7/2018 | Xu | H04W 76/10 |
| 2018/0242115 | A1* | 8/2018 | Kim | H04W 4/40 |
| 2019/0208387 | A1 | 7/2019 | Jiang et al. | |
| 2019/0230618 | A1 | 7/2019 | Saur et al. | |
| 2019/0380069 | A1* | 12/2019 | Park | H04W 36/0072 |
| 2020/0229206 | A1* | 7/2020 | Badic | G05D 1/225 |
| 2020/0312142 | A1* | 10/2020 | Su | G08G 1/0116 |
| 2021/0058832 | A1* | 2/2021 | Park | H04W 36/362 |
| 2021/0218753 | A1* | 7/2021 | Zhao | H04L 9/3268 |
| 2022/0397631 | A1* | 12/2022 | Jiang | G01S 5/10 |
| 2023/0232199 | A1* | 7/2023 | Vassilovski | H04W 4/40 |
| | | | | 455/404.1 |
| 2023/0337213 | A1* | 10/2023 | Badic | G05D 1/467 |
| 2023/0353993 | A1* | 11/2023 | Hwang | H04W 72/23 |
| 2024/0114322 | A1* | 4/2024 | Naga | H04W 4/021 |
| 2024/0260137 | A1* | 8/2024 | Kalkunte | H04W 24/04 |
| 2024/0373418 | A1* | 11/2024 | Badic | H04W 40/22 |

FOREIGN PATENT DOCUMENTS

| | | | | |
|---|---|---|---|---|
| CN | 108535753 | A | | 9/2018 |
| CN | 109118794 | A | | 1/2019 |
| CN | 109633543 | A | | 4/2019 |
| CN | 109996330 | A | | 7/2019 |
| CN | 110800324 | A * | 2/2020 | ............ H04W 4/021 |
| CN | 110800324 | B * | 4/2022 | ............ H04W 4/021 |
| EP | 3383087 | A1 * | 10/2018 | ............ H04W 16/00 |
| EP | 3644296 | A1 | | 4/2020 |
| JP | 2008292316 | A | | 12/2008 |
| JP | 2009198374 | A | | 9/2009 |
| WO | 2018233699 | A1 | | 12/2018 |
| WO | WO-2020191790 | A1 * | 10/2020 | ............ H04W 4/44 |

OTHER PUBLICATIONS

European Patent Office. Extended European Search Report for EP Application No. 20865518.3, mailed May 17, 2022, pp. 1-11.
The State Intellectual Property Office of People's Republic of China. First Office Action for CN Application No. 201910895034.4 and English translation, mailed Mar. 27, 2024, pp. 1-9.
The State Intellectual Property Office of People's Republic of China. First Search Report for CN Application No. 201910895034.4 and English translation, mailed Mar. 22, 2024, pp. 1-6.
International Searching Authority. International Search Report and Written Opinion for PCT Application No. PCT/CN2020/098274 and English translation, mailed Sep. 30, 2020, pp. 1-11.

* cited by examiner

POSITIONING METHOD, DEVICE, SYSTEM, TERMINAL FOR POSITION OF INTERNET OF VEHICLES APPARATUS AND STORAGE MEDIUM

CROSS-REFERENCE TO RELATED APPLICATION

This application is a national stage filing under 35 U.S.C. § 371 of international application number PCT/CN2020/098274, filed Jun. 24, 2020, which claims priority to Chinese patent application No. 201910895034.4, filed on Sep. 20, 2019. The contents of these applications are incorporated herein by reference in their entirety.

TECHNICAL FIELD

Embodiments of the present disclosure relate to, but are not limited to, vehicle-to-everything (V2X), and in particular to a method, device, system, and terminal device for positioning a location of a V2X apparatus, and a storage medium.

BACKGROUND

Intelligent transportation system technologies have been advancing continuously to enable safer and more intelligent transport systems. V2X is an important integral part of intelligent transportation and also a key technology for future intelligent transportation systems. The V2X technology is a technology that allows exchange of information between vehicles and the outside world by using advanced on-board sensors, controllers, actuators and other devices and incorporating modern communication and network technologies. The exchange of information mainly happens in four dimensions: vehicle-to-vehicle (V2V), vehicle-to-infrastructure (V2I), vehicle-to-pedestrian (V2P), and vehicle-to-network (V2N).

Typically, a V2X conveyance, such as an automobile, is equipped with a V2X module to implement the V2X. The V2X module is an important part for an automobile to realize V2X. The V2X module broadcasts messages in real time to other V2X apparatuses, such as road side units (RSUs) and on-board units (OBUs), within a reception range. As the RSUs can support V2N, only when the V2X transportation apparatus and the RSU are used cooperatively, can the V2X be truly realized, such that the V2X conveyance can realize not only V2V, V2P, and V2I but also V2N, enabling mutual communication between vehicles, vehicles and people, and vehicles and base stations, thus obtaining traffic information such as real-time road conditions, road information and pedestrian information.

Currently, the implementation architecture of a V2X module is to provide accurate positioning information through a positioning system, such as a global positioning system (GPS) module, and then to implement communication between V2X apparatuses based on proper functioning of the GPS module and a ready state of a V2X protocol stack. Although the GPS positioning method is relatively accurate, its signal is prone to blockage, which may result in a dead zone. A V2X apparatus can hardly realize V2X due to abnormal positioning when passing through a place with no GPS signal or even no network signal.

SUMMARY

The following is a summary of embodiments of the present disclosure. This summary is not intended to limit the scope of protection of the appended claims.

Embodiments of the present disclosure provide a method, device, system, and terminal device for positioning a location of a V2X apparatus, and a non-transitory computer-readable storage medium, which can enable the V2X apparatus to acquire accurate location information in an environment with no GPS satellite signal or even no network signal, thereby realizing real-time positioning of the V2X apparatus, so as to maintain normal communication between V2X apparatuses.

In accordance with an aspect of the present disclosure, an embodiment provides a method for positioning a location of a V2X apparatus, which may include at least:

acquiring positioning location information of the V2X apparatus at a time when a positioning system is in a normal condition; acquiring location information of at least three RSUs respectively, and acquiring latency information for broadcast packets sent by each of the at least three RSUs respectively; and obtaining location information of the V2X apparatus according to the positioning location information of the V2X apparatus, the location information of each of the at least RSUs and the latency information for the broadcast packets of each of the at least three RSUs.

In accordance with another aspect of the present disclosure, an embodiment provides a method for positioning a location of a V2X apparatus, which may include at least: acquiring positioning location information at a time when a positioning system is in a normal condition; receiving broadcast packets respectively sent by a first road side unit, a second road side unit and a third road side unit at a time when the positioning system is in a normal condition; acquiring location information of the first road side unit, the second road side unit and the third road side unit; and acquiring latency information indicating a time interval between sending and reception of each broadcast packet; receiving broadcast packets respectively sent by the first road side unit, the second road side unit and the third road side unit at a time when the positioning system is in an abnormal condition; acquiring latency information indicating a time interval between sending and reception of each broadcast packet; and obtaining location information of the V2X apparatus at time $t_{n+1}$ according to the positioning location information at a time when the positioning system is in a normal condition, the location information of the first road side unit, the second road side unit and the third road side unit, the latency information for each broadcast packet at a time when the positioning system is in a normal condition, and the latency information for each broadcast packet at a time when the positioning system is in an abnormal condition.

In accordance with yet another aspect of the present disclosure, an embodiment provides a device for positioning a location of a V2X apparatus, which may include at least a location recording module configured to record positioning location information of a V2X apparatus at a time when a positioning system is in a normal condition; a communication module configured to receive broadcast packets sent by at least three RSUs respectively, and extracting location information of the at least three RSUs and latency information for each broadcast packet; and a location calculating module configured to acquire the positioning location information of the V2X apparatus, the location information of each of the at least three RSUs and the latency information for broadcast packets of each of the at least three RSUs at two successive times, and calculating location information of the V2X apparatus according to the acquired information.

In accordance with yet another aspect of the present disclosure, an embodiment provides a system for positioning a location of a V2X apparatus, which may include a V2X system and an RSU. The RSU may include at least three sub-units, namely a first RSU (RSU1), a second RSU (RSU2), and a third RSU (RSU3). The RSU keeps sending broadcast packets at intervals to the V2X system. The broadcast packets may include at least five classes of messages specified by a V2X protocol, such as RSU location information and broadcast packet sending time information. The V2X system receives the broadcast packets sent by the at least three sub-RSUs, and records the latency of the broadcast packets and the positioning location information of the V2X system. When the positioning system for the V2X system is in an abnormal condition, the V2X system obtains current location information of the V2X system according to location information of the at least three sub-RSUs, the latency difference of broadcast packets between a time immediately before the positioning system becomes abnormal and a time immediately after the positioning system becomes abnormal, and the positioning location information of the V2X system at the time before the positioning system becomes abnormal (i.e., when the positioning system is working normally).

In accordance with yet another aspect of the present disclosure, an embodiment provides a terminal device, which may include: a memory, a processor, and a computer program stored in the memory and executable on the processor, where the processor performs, when executing the computer program, the above-mentioned method for positioning a location of a V2X apparatus in accordance with the above aspects.

In accordance with yet another aspect of the present disclosure, an embodiment provides non-transitory computer-readable storage medium storing computer-executable instructions which are configured to perform the above-mentioned method for positioning a location of a V2X apparatus in accordance with the above aspects.

Additional features and advantages of the present disclosure will be set forth in the subsequent description, and in part will become apparent from the description, or may be learned by practice of the present disclosure. The purposes and other advantages of the present disclosure can be realized and obtained by structures particularly noted in the description, the claims and the accompanying drawings.

BRIEF DESCRIPTION OF DRAWINGS

The accompanying drawings are used to provide further understanding of the technical schemes of the present disclosure and constitute a part of the description. The accompanying drawings are used to explain the technical schemes of the present disclosure together with the embodiments of the present disclosure, and do not constitute a restriction on the technical schemes of the present disclosure.

Description of reference signs:

100—positioning device; 110—communication module; 120—location calculating module; 130—location recording module; 140—positioning system determining module.

DETAILED DESCRIPTION

In order to make the objectives, technical schemes and advantages of the present disclosure more apparent, the present disclosure is further described in detail in conjunction with the accompanying drawings and embodiments. It should be understood that the particular embodiments described herein are only intended to explain the present disclosure, and are not intended to limit the present disclosure.

It should be noted that although a functional module division is shown in the schematic diagrams of the device and a logical order is shown in the flowcharts, the steps shown or described may be performed, in some cases, in a different module division from that of the device or in a different order from that in the flowcharts. The terms "first", "second", etc. in the description, the claims and the above-mentioned drawings are intended to distinguish similar objects and are not necessarily to describe a specific order or sequence.

At present, vehicle positioning mainly relies on positioning systems, such as a GPS. However, when a vehicle enters an environment with no GPS signal or even no network signal from an environment with normal GPS signals, the GPS cannot work normally to acquire positioning information of the V2X apparatus (such as the vehicle), so that the V2X cannot be realized.

On this basis, the embodiments of the present disclosure provide a method, device, system, and terminal device for positioning a location of a V2X apparatus, and a non-transitory computer-readable storage medium, where RSU (such as a road side base station) which keeps broadcasting messages at intervals is used to assist in real-time calculation and acquisition of location positioning information, thereby realizing real-time positioning for the V2X apparatus.

The embodiments of the present disclosure will be further explained below with reference to the accompanying drawings.

An embodiment of the present disclosure discloses a device for positioning a location of a V2X apparatus.

Figure 1:
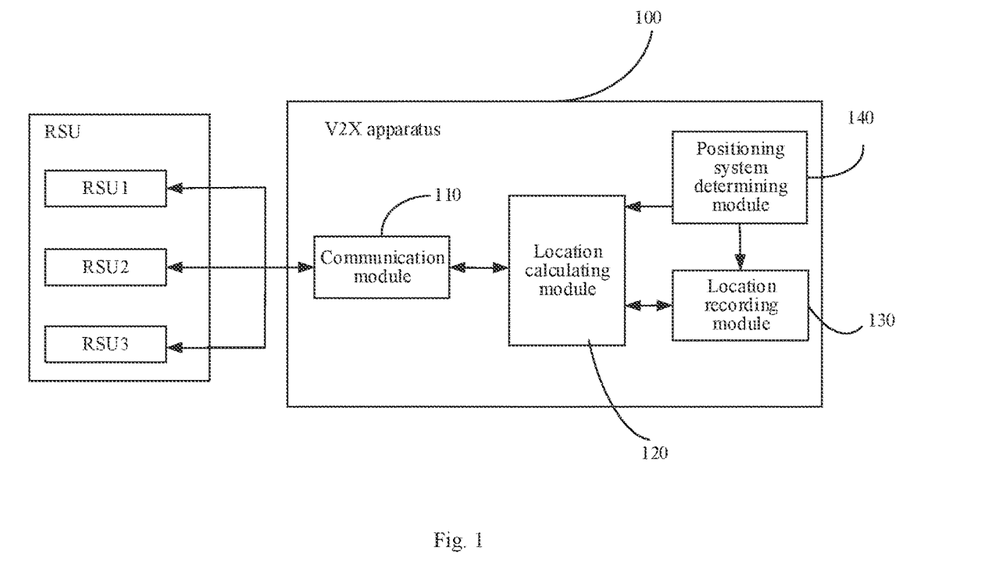
FIG. 1 is a schematic diagram of a device for positioning a location of a V2X apparatus according to an embodiment of the present disclosure.

FIG. 1 is a schematic diagram of the positioning device. As shown in FIG. 1, an RSU includes at least a first RSU (RSU1), a second RSU (RSU2), and a third RSU (RSU3), which are three sub-RSUs with fixed geographical locations. RSU1, RSU2, and RSU3 are all road side units for vehicle-to-everything, which are responsible for keeping notifying V2X apparatuses in their respective surroundings in a broadcast manner at intervals, that is, sending broadcast packet messages to the V2X apparatuses in their respective surroundings. The broadcast packet messages at least include geographical location information of RSU1, RSU2, and RSU3, and information indicating the time at which broadcast packets are sent from RSU1, RSU2, and RSU3. The broadcast packets may also include five classes of messages specified by V2X protocol, namely BSM basic vehicles, MAP location positioning, RSI traffic events, RSM safety and SPAT signal lights, so as to enable V2X applications such as forward collision warning, intersection collision warning, emergency brake warning, abnormal vehicle warning, speed limit warning, collision warning for vulnerable traffic participants, in-vehicle signage, green wave speed guidance, and signal light priority control.

The V2X device 100 receives broadcast packets sent by the RSU and records the reception time of each broadcast packet. The V2X device 100 includes at least a communication module 110, a location calculating module 120 and a location recording module 130.

The communication module 110 is configured to receive broadcast packet messages sent by RSU1, RSU2, and RSU3 in real time. The communication module 110 may also send broadcast packets to other V2X or RSU apparatuses for communication, so as to assist driving and ensure road safety.

The location calculating module 120 is configured to calculate specific location information of the V2X apparatus when GPS positioning is abnormal according to: extracted location information of RSU1, RSU2, and RSU3; positioning location information of a V2X apparatus recorded at a time immediately before GPS positioning becomes abnormal (i.e. when the positioning is normal); and a latency difference between two sets of broadcast packets from RSU1, RSU2, and RSU3 received at two successive times immediately before and after the positioning becomes abnormal, respectively.

The location recording module 130 is configured to record, in real time, the positioning location information of the V2X apparatus when GPS is working normally, or the specific location information of the V2X apparatus calculated by the location calculating module 120 when the GPS positioning is abnormal.

In an exemplary embodiment, the V2X apparatus may also include a positioning system determining module 140, such as a GPS determining module, which is configured to determine the GPS positioning state in real time, and record the positioning location information if the positioning is normal, otherwise, activate the location calculating module 130 to calculate the current location information of the V2X apparatus. The V2X apparatus may be any kind of conveyance.

Figure 2:
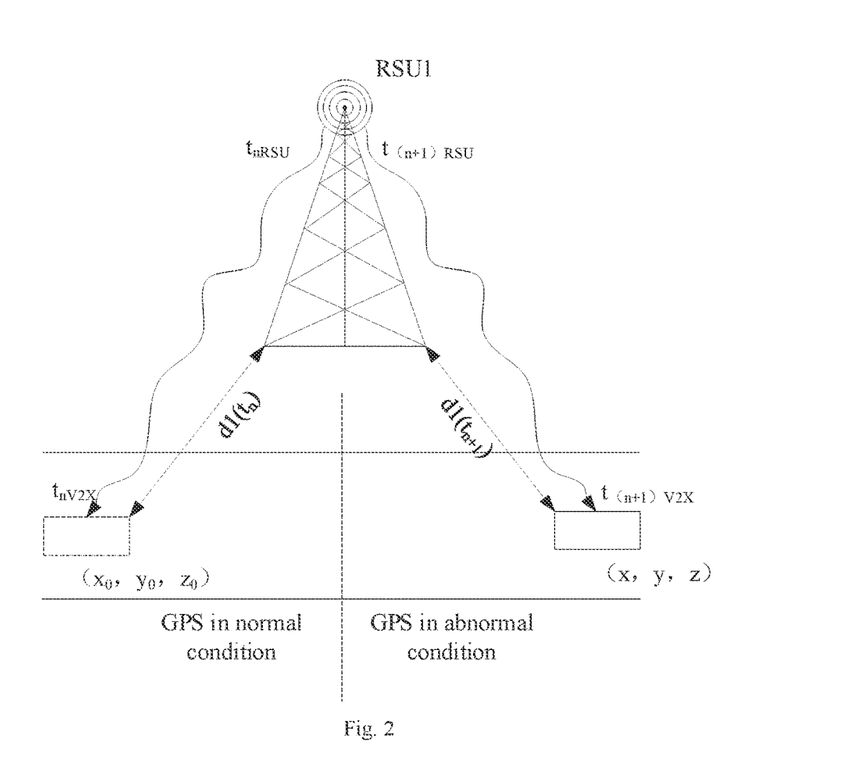
FIG. 2 is a schematic diagram of a working process of a device for positioning a location of a V2X apparatus according to an embodiment of the present disclosure.
Figure 3:
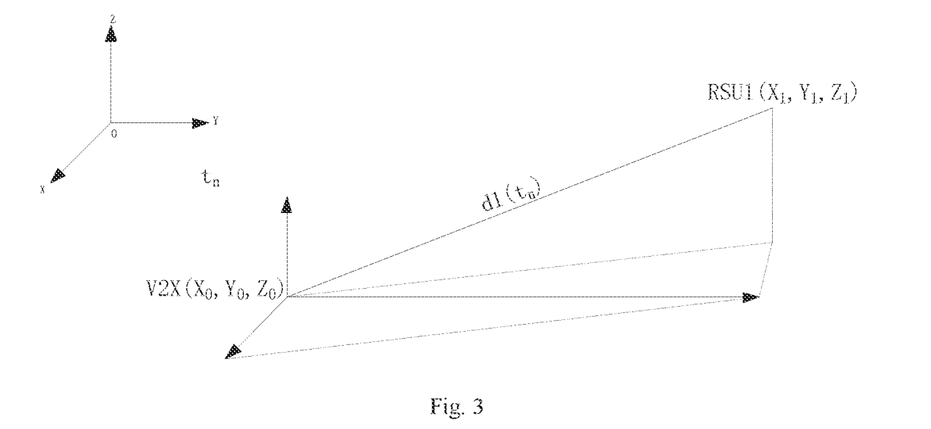
FIG. 3 is a schematic diagram of a distance between an RSU and a V2X apparatus at a first location according to an embodiment of the present disclosure.
Figure 4:
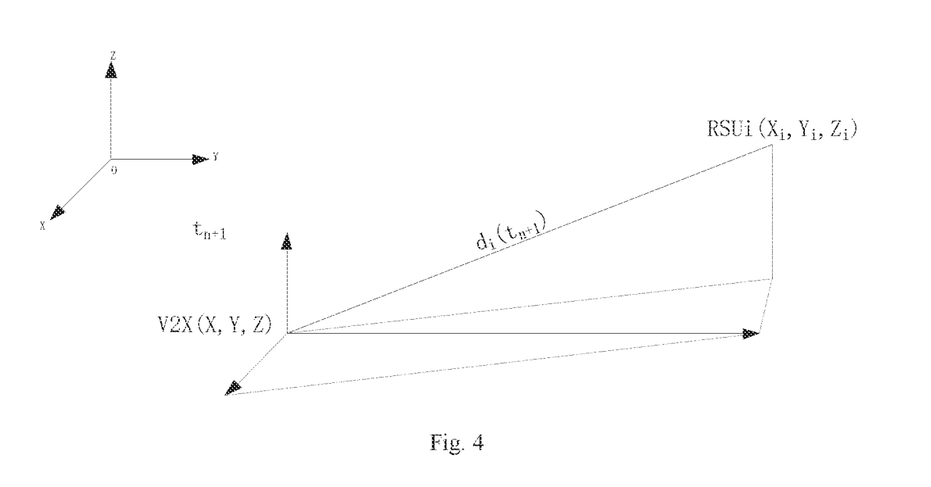
FIG. 4 is a schematic diagram of a distance between an RSU and a V2X apparatus at a second location according to an embodiment of the present disclosure.

On the basis of FIGS. 2 to 4, a working process of a device for positioning a V2X apparatus provided in this embodiment is illustrated by an example.

As shown in FIG. 2, the V2X apparatus drives from an environment with normal GPS signals to an environment with abnormal GPS signals, that is, the V2X apparatus drives from a known location $(x_0, y_0, z_0)$ to a location $(x, y, z)$.

Taking RSU1 as an example, GPS is working normally at time $t_n$, and RSU1 sends a broadcast packet to the V2X apparatus at time $t_{nRSU}$. The V2X apparatus receives the broadcast packet at time $t_{nv2x}$ because it takes time to transmit the broadcast packet, and in this case, the latency of the broadcast packet is expressed as $latency1(t_n)=t_{nRSU}$.

GPS is in an abnormal condition at time $t_{(n+1)}$, and RSU1 sends a broadcast packet to the V2X apparatus at time $t_{(n+1)RSU}$. The V2X apparatus receives the broadcast packet at time $t_{(n+1)v2x}$. In this case, the latency of the broadcast packet is expressed as $latency1(t_{n+1})=t_{(n+1)v2x}-t_{(n+1)RSU}$.

The latency1(t) includes the duration during which the broadcast packet is processed inside RSU1, the duration during which the broadcast packet travels in the air, and the duration during which the broadcast packet is processed inside the V2X. Because all the broadcast packets have the same processing durations inside RSU1 and the same processing durations inside V2X, the latency difference of broadcast packets between $t_n$ and $t_{(n+1)}$, i.e. $latency1(t_n)-latency1(t_{n+1})$, is the difference between the travelling durations in the air of the broadcast packets received at the two successive times. The propagation speed of the broadcast packet over the air is C, and based on the above latency difference, the difference of the distance from RSU1 to the V2X apparatus between the above two times, i.e. $d1(t_n)-d1(t_{n+1})$, can be known, where $d1(t_n)$ is the distance from RSU1 to the V2X apparatus at time $t_n$, and $d1(t_{n+1})$ is the distance from RSU1 to the V2X apparatus at time $t_{n+1}$.

Likewise, the difference of distance from RSU2 to the V2X apparatus between the two successive times, i.e. $d2(t_n)-d2(t_{n+1})$, and the difference of distance from RSU3 to the V2X apparatus between the two successive times, i.e. $d3(t_n)-d3(t_{n+1})$ can be known, where $d2(t_n)$ and $d3(t_n)$ are the distance from RSU2 to the V2X apparatus and the distance from RSU3 to the V2X apparatus, respectively, at time $t_n$, and $d2(t_{n+1})$ and $d3(t_{n+1})$ are the distance from RSU2 to the V2X apparatus and the distance from RSU3 to the V2X apparatus, respectively, at time $t_{n+1}$.

In response to abnormal GPS positioning, the location calculating module 120 extracts the following information: location information $(x_1, y_1, z_1)$ of RSU1; latency difference of broadcast packets of RSU1 between $t_n$ and $t_{(n+1)}$, $latency1(t_n)-latency1(t_{n+1})$; and positioning location information $(x_0, y_0, z_0)$ of the V2X apparatus at time $t_n$.

As shown in FIG. 3, in this case, the distance $d1(t_n)$ between RSU1 and the V2X apparatus at time $t_n$ satisfies the following formula (i.e. the distance formula between two points in space): $d1(t_n)^2=(x_1-x_0)^2+(y_1-y_0)^2+(z_1-z_0)^2$, so the distances $d1(t_n)$, $d2(t_n)$, and $d3(t_n)$ between the V2X apparatus and RSU1, RSU2, and RSU3 at time $t_n$ can be known.

Then, the distance $d1(t_{n+1})$ from RSU1 to the V2X apparatus at time $t_{n+1}$ can be obtained from the difference of distance from RSU1 to the V2X apparatus between these two times.

Likewise, the distance $d2(t_{n+1})$ between RSU2 and the V2X apparatus at time $t_{n+1}$ and the distance $d3(t_{n+1})$ between RSU3 and the V2X apparatus at time $t_{n+1}$ can be obtained. As shown in FIG. 4, at time $t_{n+1}$, the location $(x, y, z)$ of the V2X apparatus satisfies $di(t_{n+1})^2=(x_i-x)^2+(y_i-y)^2+(z_i-z)^2$, where i=1, 2, 3;

i.e.

$$d1(t_{n+1})^2=(x_1-x)^2+(y_1-y)^2+(z_1-z)^2$$

$$d2(t_{n+2})^2=(x_2-x)^2+(y_2-y)^2+(z_2-z)^2$$

$$d3(t_{n+3})^2=(x_3-x)^2+(y_3-y)^2+(z_3-z)^2.$$

According to the above formulae, the location information $(x, y, z)$ of the V2X apparatus at time $t_{n+1}$ can be obtained.

With the device in the above embodiment, accurate location information of a vehicle when the GPS signal is abnormal can be acquired, as long as accurate location information of the vehicle at an earlier time is known and the V2X apparatus is within a range where it can communicate with at least three RSU apparatuses.

It should be noted that the positioning device for the V2X apparatus in this embodiment is not limited to the GPS positioning system, which is also applicable to other systems or methods that can realize accurate positioning, such as the Beidou Navigation Satellite System. The location information that can be acquired is geocentric rectangular coordinate system location information or geodetic coordinate system location information, and the geodetic coordinate system location information can be converted into the geocentric rectangular coordinate system location information by formulae.

Figure 5:
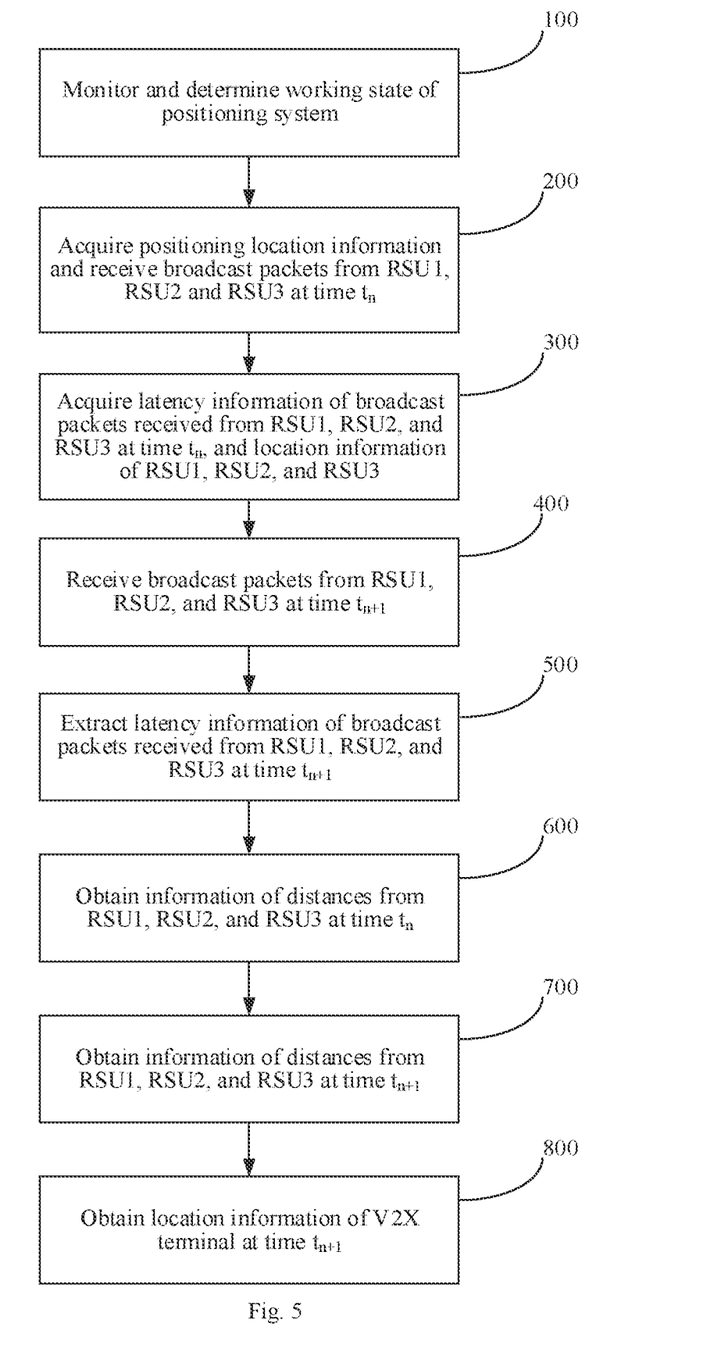
FIG. 5 is a flowchart of a method for positioning a location of a V2X apparatus according to an embodiment of the present disclosure.

FIG. 5 is a method for positioning a location of a V2X apparatus according to another embodiment of the present disclosure. As shown in FIG. 5, the method includes the following steps.

At step 100, the working state of a positioning system of the V2X apparatus is monitored and determined in real time.

At step 200, positioning location information of the V2X apparatus at a present time $t_n$ is acquired, and broadcast packets respectively from RSU1, RSU2, and RSU3 are received.

At step 300, latency information for the broadcast packets respectively received from RSU1, RSU2, and RSU3 at time $t_n$, and location information of RSU1, RSU2 and RSU3, are acquired.

The latency information for the RSU1 broadcast packet is the time difference between the time at which RSU1 sends a broadcast packet and the time at which V2X receives the broadcast packet, the latency information for the RSU2 broadcast packet is the time difference between the time at which RSU2 sends a broadcast packet and the time at which V2X receives the broadcast packet, and the latency information for the RSU3 broadcast packet is the time difference between the time at which RSU3 sends a broadcast packet and the time at which V2X receives the broadcast packet.

At step 400, broadcast packets respectively from RSU1, RSU2, and RSU3 at the present time $t_{n+1}$ are received.

At step 500, latency information for the broadcast packets respectively received from RSU1, RSU2, and RSU3 at time $t_{n+1}$, are acquired.

At step 600, distance information between the V2X apparatus and RSU1, RSU2, and RSU3, respectively, at time $t_{n+1}$, are obtained, according to the positioning location at time $t_n$, and the location information of RSU1, RSU2, and RSU3.

At step 700, distance information between the V2X apparatus and RSU1, RSU2, and RSU3, respectively, at time $t_{n+1}$, are obtained, according to the latency information for the broadcast packets respectively received from RSU1, RSU2, and RSU3 at the two successive times $t_n$ and $t_{n+1}$, and the distance information between the V2X apparatus and RSU1, RSU2, and RSU3 at time $t_n$.

At step 800, the V2X apparatus obtains location information of the V2X apparatus at time $t_{n+1}$ according to the location information of RSU1, RSU2, and RSU3, and the distance information between the V2X apparatus and RSU1, RSU2, and RSU3 respectively at time $t_{n+1}$.

In an exemplary embodiment, the broadcast packet may include five classes of messages specified by V2X protocol, i.e. BSM basic vehicles, MAP location positioning, RSI traffic events, RSM safety and SPAT signal lights.

In an exemplary embodiment, the method further includes step 900. At step 900, the V2X apparatus records location information at time $t_{n+1}$ and transmitting the location information to RSU1, RSU2, and RSU3. It is also possible to send broadcast packets to other V2X and RSU apparatuses for communication, so as to assist driving and ensure road safety.

In another embodiment of the present disclosure, there is provided a method for positioning a location of a V2X apparatus, which includes at least: acquiring, when a positioning system for the V2X apparatus is in a normal condition, positioning location information of the V2X apparatus at a present time $t_n$, receiving broadcast packets sent by a first RSU (RSU1), a second RSU (RSU2) and a third RSU (RSU3), and extracting latency information indicating a time interval between sending and reception of each broadcast packet and fixed location information of RSU1, RSU2, and RSU3; receiving and extracting, when the positioning system is in an abnormal condition, the latency information for the broadcast packets of RSU1, RSU2, and RSU3 indicating a time interval between sending and reception at the present time $t_{n+1}$; calculating distances $d1(t_n)$, $d2(t_n)$ and $d3(t_n)$ between the V2X apparatus and the RSU1, RSU2, and RSU3, respectively, at time $t_n$ according to the positioning location information of the V2X apparatus at time $t_n$ and the location information of the RSU1, RSU2, and RSU3 and based on the distance formula between two points in space; then obtaining distances $d1(t_{n+1})$, $d2(t_{n+1})$ and $d3(t_{n+1})$ between the V2X apparatus and RSU1, RSU2, and RSU3 at time $t_{n+1}$ according to the latency difference of broadcast packets between the $t_n$ and $t_{n+1}$, i.e. the difference between two successive pieces of latency information; and finally obtaining location information of the V2X apparatus at time $t_{n+1}$ according to the location information of RSU1, RSU2, and RSU3 and the distances $d1(t_{n+1})$, $d2(t_{n+1})$, and $d3(t_{n+1})$ between the V2X apparatus and the RSU1, RSU2, and RSU3 at time $t_{n+1}$.

Next, on the basis of FIG. 6, the implementation of the method for positioning a location of a V2X apparatus provided in this embodiment will be described in detail by way of an example.

When the V2X apparatus starts the working process, the V2X apparatus starts to receive broadcast packets sent by RSU1, RSU2, and RSU3, including at least detailed location information of RSU1, RSU2, and RSU3, i.e. $(x_1, y_1, z_1)$, $(x_2, y_2, z_2)$, and $(x_3, y_3, z_3)$, respectively; and monitor and determine the state of a positioning system (such as a GPS) in real time, and if the GPS positioning is successful, the following step will be performed.

Location information $(x_0, y_0, z_0)$ of the V2X apparatus at time $t_n$ is recorded in real time; and latency information latency1$(t_n)$, latency2$(t_n)$ and latency3$(t_n)$ of broadcast packets respectively sent by RSU1, RSU2, and RSU3 in a broadcast manner that are received at time $t_n$, are extracted and recorded.

The latency1$(t_n)$ of the broadcast packet is the time difference between the time $t_n$ at which the broadcast packet is received by the V2X apparatus and the time at which the same broadcast packet is sent by RSU1. The latency2$(t_n)$ of the broadcast packet is the time difference between the time $t_n$ at which the broadcast packet is received by the V2X apparatus and the time at which the same broadcast packet is sent by RSU2. The latency3$(t_n)$ of the broadcast packet is the time difference between the time $t_n$ at which the broadcast packet is received by the V2X apparatus and the time at which the same broadcast packet is sent by RSU3.

Assuming that the GPS positioning is normal at time $t_n$, but the GPS positioning is abnormal when a next set of RSU broadcast packets are received, i.e. at time $t_{n+1}$, the following steps will be performed.

Latency information latency1($t_{n+1}$), latency2($t_{n+1}$) and latency3($t_{n+1}$) of broadcast packets sent by RSU1, RSU2, and RSU3 in a broadcast manner that are received at time $t_{n+1}$, are extracted and recorded.

Positioning calculation is started as follows.

According to the location information ($x_0$, $y_0$, $z_0$) of the V2X apparatus at time $t_n$, combined with the location information of RSU1, RSU2, and RSU3, i.e. ($x_1$, $y_1$, $z_1$), ($x_2$, $y_2$, $z_2$), and ($x_3$, $y_3$, $z_3$), respectively, the following equation can be established:

$$d1(t_n)^2=(x_1-x_0)^2+(y_1-y_0)^2+(z_1-z_0)^2$$

$$d2(t_n)^2=(x_2-x_0)^2+(y_2-y_0)^2+(z_2-z_0)^2$$

$$d3(t_n)^2=(x_3-x_0)^2+(y_3-y_0)^2+(z_3-z_0)^2$$

From the above formula, the distances $d1(t_n)$, $d2(t_n)$ and $d3(t_n)$ from the V2X apparatus to RSU1, RSU2, and RSU3, respectively, at time $t_n$ can be obtained.

Figure 6:
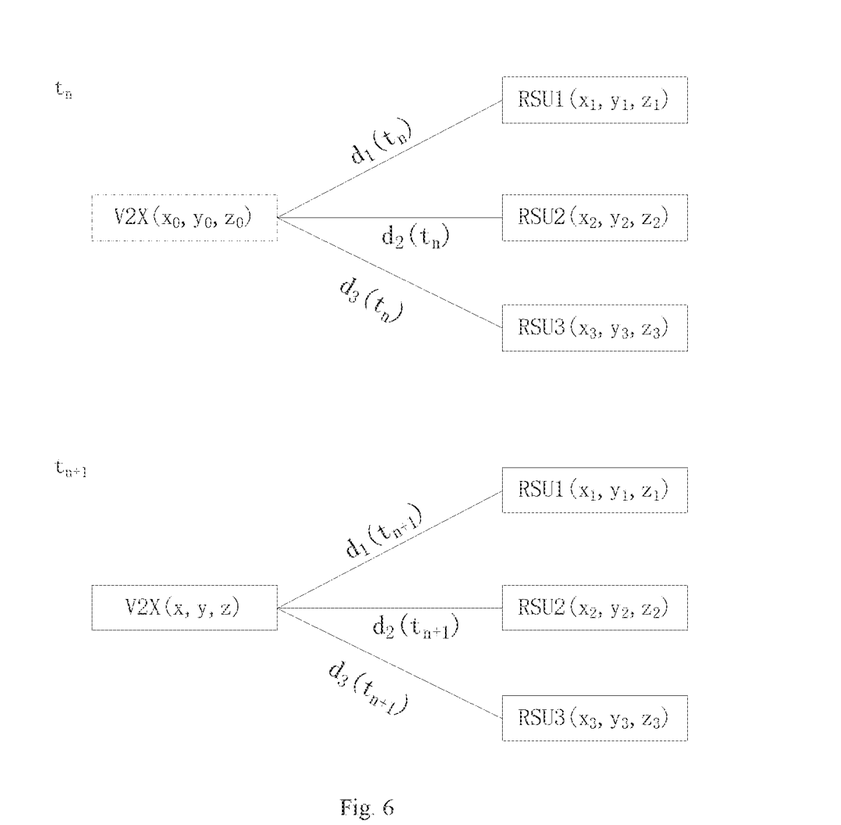
FIG. 6 is a schematic diagram of distances between an RSU and a V2X apparatus at two successive times according to an embodiment of the present disclosure.

As shown in FIG. 6, for the V2X apparatus, according to the latency difference of broadcast packets between two successive times $t_n$ and $t_{n+1}$, the following equation can be established:

$$[\text{latency}1(t_n)-\text{latency}1(t_{n+1})]*c=d1(t_n)-d1(t_{n+1})$$

$$[\text{latency}2(t_n)-\text{latency}2(t_{n+1})]*c=d2(t_n)-d2(t_{n+1})$$

$$[\text{latency}3(t_n)-\text{latency}3(t_{n+1})]*c=d3(t_n)-d3(t_{n+1})$$

where c is the propagation speed of electromagnetic waves in the air.

From the above formulae, the distances $d1(t_{n+1})$, $d2(t_{n+1})$ and $d3(t_{n+1})$ between the V2X apparatus and RSU1, RSU2 and RSU3 at time $t_{n+1}$ can be obtained.

For the V2X apparatus, according to the distances $d1(t_{n+1})$, $d2(t_{n+1})$ and $d3(t_{n+1})$ between the V2X apparatus and RSU1, RSU2, and RSU3 at time $t_{+1}$, combined with the location information ($x_1$, $y_1$, $z_1$), ($x_2$, $y_2$, $z_2$), and ($x_3$, $y_3$, $z_3$) of RSU1, RSU2, and RSU3, the following equation can be established:

$$di(t_{n+1})^2=(x_i-x)^2+(y_i-y)^2+(z_i-z)^2, (i=1, 2, 3)$$

i.e.

$$d1(t_{n+1})^2=(x_1-x)^2+(y_1-y)^2+(z_1-z)^2$$

$$d2(t_{n+2})^2=(x_2-x)^2+(y_2-y)^2+(z_2-z)^2$$

$$d3(t_{n+3})^2=(x_3-x)^2+(y_3-y)^2+(z_3-z)^2.$$

From the above formulae, the location (x, y, z) of the V2X apparatus at time $t_{n+1}$ can be obtained.

The V2X apparatus saves the above real-time calculated location information for continuous communication, and continues to periodically determine the positioning state to decide whether it is necessary to start location positioning auxiliary calculation in response to reception of the next RSU message.

This embodiment discloses a V2X apparatus, where when a positioning system of the V2X apparatus is in a normal condition, a V2X module of the V2X apparatus is working normally to realize V2X; and when the positioning system of the V2X apparatus is in an abnormal condition, the V2X apparatus starts positioning calculation to obtain the position of the apparatus, so as to keep the V2X module working normally and to realize V2X.

Figure 7:
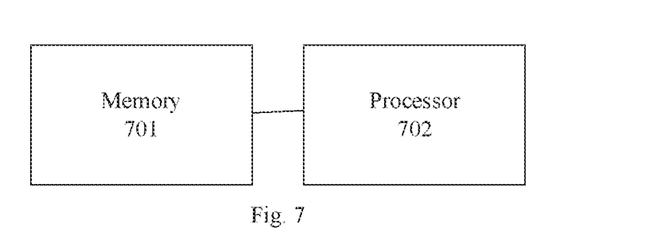
FIG. 7 is a schematic structural diagram of a terminal device at a location of a V2X apparatus according to an embodiment of the present disclosure.

FIG. 7 is a schematic structural diagram of a terminal device at a location of a V2X apparatus according to an embodiment of the present disclosure, where the terminal device includes: a memory 701, a processor 702, and a computer program stored in the memory and executable on the processor, where the processor performs, when executing the computer program, the above-mentioned method for positioning a location of a V2X apparatus in accordance with the above aspects.

Another embodiment of the present disclosure further provides a non-transitory computer-readable storage medium storing computer-executable instructions which are configured to perform the above-mentioned method for positioning a location of a V2X apparatus in accordance with the above aspects.

According to the embodiments of the present disclosure, at least three RSUs with fixed locations keep sending broadcast packets conforming to V2X protocol regulations at intervals to a V2X apparatus, and when a positioning system of the V2X apparatus is in an abnormal condition, information contained in the broadcast packets at the present time and information contained in the broadcast packets at a time immediately before the positioning system of the V2X apparatus becomes abnormal are used to calculate and acquire location information of the V2X apparatus in real time, thereby realizing real-time positioning of the V2X apparatus, so as to solve the problem that an existing V2X apparatus cannot exchange location information with the outside world when a positioning system of the V2X apparatus is not working properly.

It can be understood by those having ordinary skills in the art that all or some of the steps of the methods, functional modules/units in the devices and systems disclosed above may be implemented as software, firmware, hardware and appropriate combinations thereof. In the hardware implementation, the division between functional modules/units mentioned in the above description does not necessarily correspond to the division of physical components; for example, a physical component may have multiple functions, or a function or step may be performed cooperatively by several physical components. Some or all of the physical components may be implemented as software executed by a processor, such as a central processing unit, a digital signal processor or a microprocessor, or as hardware, or as an integrated circuit, such as an application specific integrated circuit. Such software can be distributed on computer-readable media, which can include computer storage media (or non-transitory media) and communication media (or transitory media). As well known to those of ordinary skills in the art, the term computer storage medium includes volatile and non-volatile, removable and non-removable media implemented in any method or technology for storing information, such as computer readable instructions, data structures, program modules or other data. A computer storage medium includes but is not limited to RAM, ROM, EEPROM, flash memory or other memory technologies, CD-ROM, digital versatile disk (DVD) or other optical disk storage, cassettes, magnetic tapes, magnetic disk storage or other magnetic storage devices, or any other medium that can be configured to store desired information and can be accessed by a computer. Furthermore, it is well known to those of ordinary skills in the art that communication media typically contain computer-readable instructions, data structures, program modules or other data in a modulated data signal such as a carrier wave or other transmission mechanism, and can include any information delivery media.

The above is a detailed description of some implementations of the present disclosure, but the present disclosure is not limited to the above-mentioned embodiments. Those having ordinary skills in the art can also make various equivalent modifications or replacements without departing from the gist of the present disclosure, and these equivalent modifications or replacements are all included in the scope defined by the appended claims of the present disclosure.

The invention claimed is:

1. A positioning method, comprising:

acquiring positioning location information of a vehicle-to-everything (V2X) apparatus at a time when a positioning system is in a normal condition;

receiving broadcast packets from each of at least three road side units (RSUs), to acquire location information of the at least three RSUs respectively, and acquire latency information for the broadcast packets of each of the RSUs respectively; and obtaining location information of the V2X apparatus according to the positioning location information of the V2X apparatus at the time when the positioning system is in the normal condition, the location information of each of the RSUs, and the latency information for the broadcast packets of each of the RSUs;

wherein the latency information comprise latency information at the time when the positioning system is in the normal condition and latency information at a time when the positioning system is in an abnormal condition.

2. The method of claim 1, wherein the latency information for the broadcast packets of each of the RSUs comprises at least latency information for a first broadcast packet and latency information for a second broadcast packet; and the latency information for each of the broadcast packets is a time interval between sending of the broadcast packet and reception of the same broadcast packet.

3. The method of claim 2, wherein the V2X apparatus receives the latency information for the first broadcast packet at a time before the positioning system becomes abnormal; and the V2X apparatus receives the latency information for the second broadcast packet at another time after the positioning system becomes abnormal.

4. A method for positioning of a vehicle-to-everything (V2X) apparatus, comprising:

acquiring positioning location information at a time when a positioning system is in a normal condition;

receiving broadcast packets respectively sent by a first road side unit (RSU), a second RSU, and a third RSU at the time when the positioning system is in the normal condition; acquiring location information of the first RSU, the second RSU, and the third RSU; and acquiring latency information indicating a time interval between sending and reception of each broadcast packet;

receiving broadcast packets respectively sent by the first RSU, the second RSU, and the third RSU at a time when the positioning system is in an abnormal condition; acquiring latency information indicating a time interval between sending and reception of each broadcast packet; and obtaining location information of the V2X apparatus at the time when the SNSS positioning system is in the abnormal condition according to the positioning location information at the time when the positioning system is in the normal condition, the location information of the first RSU, the second RSU and the third RSU, the latency information for each broadcast packet at the time when the positioning system is in the normal condition, and the latency information for each broadcast packet at the time when the positioning system is in the abnormal condition.

* * * * *